US005494380A

United States Patent [19]
Morrison et al.

[11] Patent Number: 5,494,380
[45] Date of Patent: Feb. 27, 1996

[54] RESIN INJECTOR SYSTEM

[75] Inventors: Ward D. Morrison; Perry L. Coombs, both of Claremont, N.H.

[73] Assignee: Cannon Industries, Inc., Claremont, N.H.

[21] Appl. No.: 366,294

[22] Filed: Dec. 24, 1994

[51] Int. Cl.$^{6}$ .................................. E02D 3/12; E02D 3/02; B65G 53/08

[52] U.S. Cl. .......................... 405/269; 405/259.6; 405/264

[58] Field of Search .................................. 405/269, 259.6, 405/258, 264, 233; 15/104.062, 104.061

[56] References Cited

U.S. PATENT DOCUMENTS 4,096,944 6/1978 Simpson .............................. 405/233 X
4,706,806 11/1987 Mauthe ............................ 405/259.6 X
4,765,778 8/1988 Valentine ........................... 405/269 X
4,792,066 12/1988 Kobayashi .......................... 405/269 X
4,832,536 5/1989 Spross et al. ........................... 405/303

*Primary Examiner*—Stephen J. Novosad
*Attorney, Agent, or Firm*—Michael J. Weins

[57] ABSTRACT

The present invention relates to a system and a method which employs gas to position a resin sausage into a bolt hole drilled by a rock bolter. The system provides a controlled quantity of liquid into a resin sausage insertion chamber prior to supplying the gas to eject the sausage from the resin sausage insertion chamber. The liquid enhances the reliability and accuracy of the placement of the sausages in the bolt hole. Preferably, the system includes an expansion chamber through which the gas passes. The expansion chamber is provided so that the gas can be partially displaced by liquid and thereafter, liquid will be advanced into the resin sausage insertion chamber prior to the gas. The system can either have its own fluid supply or alternatively use a fluid supply of the rock bolter if one is provided for flushing the bolt holes. In either case, it is preferred that the expansion chamber is adjustable so as to allow the volume of liquid and gas to be adjusted for the operating conditions of the rock bolter.

12 Claims, 6 Drawing Sheets

RESIN INJECTOR SYSTEM

FIELD OF INVENTION

The present invention relates to a method for setting rock bolts with a resin binder and more particularly to a system and method for injecting resin sausages into bolt holes.

BACKGROUND OF THE INVENTION

Rock bolts in combination with plates through which they pass are used in underground structures such as mines to reinforce the rock. These rock bolts are installed by a rock bolter which drills a bolt hole and then places a bolt therein. When the bolts are held in place by resin, the rock bolter drills the bolt holes and thereafter resin sausages are placed in the bolt holes. The casing of the resin sausage is broken by inserting a bolt into the bolt hole and the resin from the sausage forms a bond between the bolt and the rock. Frequently during drilling the holes are flushed while being drilled to remove chips generated while drilling. Flushing the bolt holes while drilling increases the efficiency of drilling and can enhance the bond between the rock and the bolt inserted therein. Flushing can be accomplished by injecting a fluid into the bolt hole while it is being drilled. Typically, a fluid, such as water or air, is employed for flushing. In either case, the fluid serves to purge the bolt hole being drilled of debris. Preferably, to reduce dust generated by flushing with a gas such as air, small quantities of liquid, such as water, are dispersed in the flushing air. The dispersion of water in the air serves to pelletize the dust.

The resin sausage used for setting the rock bolt is injected into the bolt hole by placing the resin sausage in a resin sausage insertion chamber which is connected to a flexible tube which terminates in a resin sausage inserter. The resin sausage inserter is aligned with the bolt hole and the resin sausage is passed into and through the flexible tube and is directed into the bolt hole by the resin sausage inserter. The resin sausage is provided with a flexible sheet of material which is attached to and surrounds the resin sausage forming a parachute. The parachute maintains the resin sausage in the hole after the resin sausage has been injected into the bolt hole and before the bolt has been positioned therein. The parachute also reduces the amount of gas bypassing the resin sausage as it is ejected from the resin sausage insertion chamber and advanced by the gas through the flexible tube and the resin sausage inserter.

The method described above for injecting a resin sausage into a bolt hole frequently results in the resin sausage not being properly positioned in the bolt hole. On other occasions, the resin sausage prematurely ruptures before a bolt is positioned in the bolt hole. Both of the above problems can result in inadequate bonding between the rock bolt and the hole.

Thus, there is a need for a method which will assure the injection of a resin sausage with greater precision and without premature rupture as well as a system to practice the same.

OBJECTS OF THE INVENTION

It is an object of the invention to provide a method for increasing accuracy and efficiency of the placement of resin sausages in bolt holes.

It is another object of the invention to provide a method for more effectively advancing a resin sausage through a flexible tube and a resin sausage inserter.

Yet another object of the invention is to provide an apparatus for inserting resin sausages into bolt holes which reduces the likelihood of ripping the resin sausage while being positioned in the bolt hole.

It is still another object of the present invention to provide an apparatus which will provide a controlled volume of water for resin injection which resides between the resin sausage and the gas.

These and other objects of the invention will become apparent from the following description, drawing and claims.

SUMMARY OF THE INVENTION

The present invention relates to a system and method for enhancing the ability of a rock bolter to reliably and accurately place resin sausages in bolt holes.

Both the system and method of the present invention employ a conventional rock bolter which is designed to drill bolt holes. Rock bolters, such as those suited to practice the present invention, have a resin sausage insertion chamber into which a resin sausage is inserted. The resin sausage insertion chamber is connected to a flexible tube and a resin sausage inserter. To position the resin sausage in a bolt hole, the resin sausage insertion chamber is pressurized with gas and, when the resin sausage inserter is aligned with the bolt hole, the gas pressure projects the resin sausage along the flexible tube and through the resin sausage inserter into the bolt hole.

The improvement of the method of the present invention, in an elementary form, consists of injecting a controlled volume of liquid into the resin sausage insertion chamber of the rock bolter prior to injection of gas which ejects the resin sausage contained therein. The method of the present invention includes placing a resin sausage into the insertion chamber which is then closed. After closing the resin sausage insertion chamber, liquid is then supplied to the resin sausage insertion chamber prior to the introduction of gas. The gas is supplied to eject the resin sausage from the resin sausage insertion chamber and advance the resin sausage through the flexible tube and the resin sausage inserter. The flexible tube and the resin sausage inserter direct the resin sausage into the bolt hole with which the resin sausage inserter is aligned. When water is the liquid and air is the gas employed, between 4 and 50 ounces of water are supplied to the resin sausage insertion chamber before the air is supplied. It has been found that usually between 8 and 20 ounces of water are preferred. The option range depends on variables such as the chamber size and the sausage size. The option range also depends on the type of rock into which the resin sausage is being inserted and configuration of the flexible tube and the resin sausage inserter.

The system for implementing the method of the present invention has several embodiments. The system, in an elementary form, has a resin injection gas line and a liquid injection line both of which communicate with the resin sausage insertion chamber. The communication can either be direct with the resin sausage insertion chamber or it can be through a common line. For example, a branch line can be provided between the liquid injection line and the resin injection gas line so that the liquid is introduced into the resin injection gas line. Means for injecting a controlled volume of liquid into the resin sausage insertion chamber are provided.

In one embodiment of the system of the present invention, a gas off/on valve in the resin injection gas line and a liquid off/on valve in the liquid injection line, in combination with a means for sequentially opening and closing the off/on valves, serve as a means for injecting the controlled volume of liquid into the resin sausage insertion chamber. In this embodiment, the means for sequentially opening and closing the off/on valves is designed to assure that the liquid precedes the gas into the resin sausage insertion chamber. Control of the sequence of injecting the liquid and gas can be provided by hand or by a variety of timing means, such as a clock, which can be set to sequentially open and close the liquid off/on valve and the gas off/on valve. Alternatively, a flow meter could be used in the liquid injection line to meter the flow of liquid, turning off the flow of liquid after a predetermined volume has passed and thereafter initiating the flow of gas in the resin injection gas line.

While the system described above will offer an improvement over the current systems which do not inject liquid into the resin sausage insertion chamber, the system's success will depend on its ability to supply liquid to the resin sausage insertion chamber at a rate sufficient to have it maintain a seal between the resin sausage and the resin sausage insertion chamber.

It has been found that the preferred means for injection of a controlled volume of liquid into the resin sausage insertion chamber is an expansion chamber which is interposed between the two lines, the resin injection gas line and the liquid injection line, and the resin sausage insertion chamber. In this case, both the liquid and gas are introduced into the expansion chamber and both fluids leave through a fluid port. The expansion chamber provides a means for delivering the liquid before the gas thereby assuring a liquid seal is established and maintained around the resin sausage during ejection from the resin sausage insertion chamber.

The expansion chamber has a gas port which connects to the resin injection gas line and a liquid port which connects to the liquid injection line. The gas port and the liquid port are provided for the introduction of gas and liquid into the expansion chamber. These fluids are expelled from the expansion chamber through a fluid port. The gas port is positioned at an elevation higher than the fluid port. A fluid line connects the fluid port to the resin sausage insertion chamber. Interposed in the fluid line is a fluid off/on valve which controls the flow of fluids into the resin sausage insertion chamber. This valve allows a head of liquid to develop such that the fluid port will be below the liquid level thereby assuring that the liquid precedes the gas into the resin sausage insertion chamber.

When the expansion chamber is employed, it is further preferred that a resin injection gas line check valve be included in the resin injection gas line to prevent gas from flowing back through the resin injection gas line when liquid is being added to the expansion chamber. Similarly, the liquid injection line has a liquid injection line check valve which prevents back flow in the liquid injection line when gas is being supplied to the expansion chamber.

The expansion chamber preferably has a volume which can be varied. Having an expansion chamber with a variable volume allows the relative amounts of liquid and gas stored in the chamber to be varied, while maintaining a constant pressure in the resin injection gas line and the liquid injection line. Such adjustment allows the quantity of liquid to be varied as needed to provide a seal between the resin sausage and the resin sausage insertion chamber and to prevent leakage of gas around the resin sausage.

A preferred embodiment of an adjustable expansion chamber employs a shell to form the expansion chamber. The shell has the liquid port and the fluid port therein. The gas port is also provided in the shell and is elevated with respect to the fluid port. The shell is provided with means for adjusting the volume of the expansion chamber. One elementary means of varying the volume of the expansion chamber is to provide a solid mass which can be placed in the shell of the expansion chamber thereby reducing its effective volume.

While the insertion of a solid mass into the expansion chamber will alter its effective volume of the chamber, a preferred expansion chamber has means for adjustment of its volume by employing a shell which has a sleeve having a first sleeve end and second sleeve end. The sleeve is terminated by a first end which engages the first sleeve end and a second end which engages the second sleeve end. To provide adjustments of the volume of the expansion chamber, at least one of the ends slidably engages the sleeve. Means are provided for moving the first end relative to the second end to provide for adjustment of the expansion chamber.

It is further preferred that the means for moving the first end relative to the second end are a first end bracket attached to the first end and a second end bracket attached to the second end. These brackets are designed to engage at least one brace. Means are also provided for locking the first bracket and the second bracket with respect to the brace. It is further preferred that either the first end or the second end be fixed with respect to the sleeve.

BEST MODE FOR CARRYING THE INVENTION INTO PRACTICE

Figure 1:
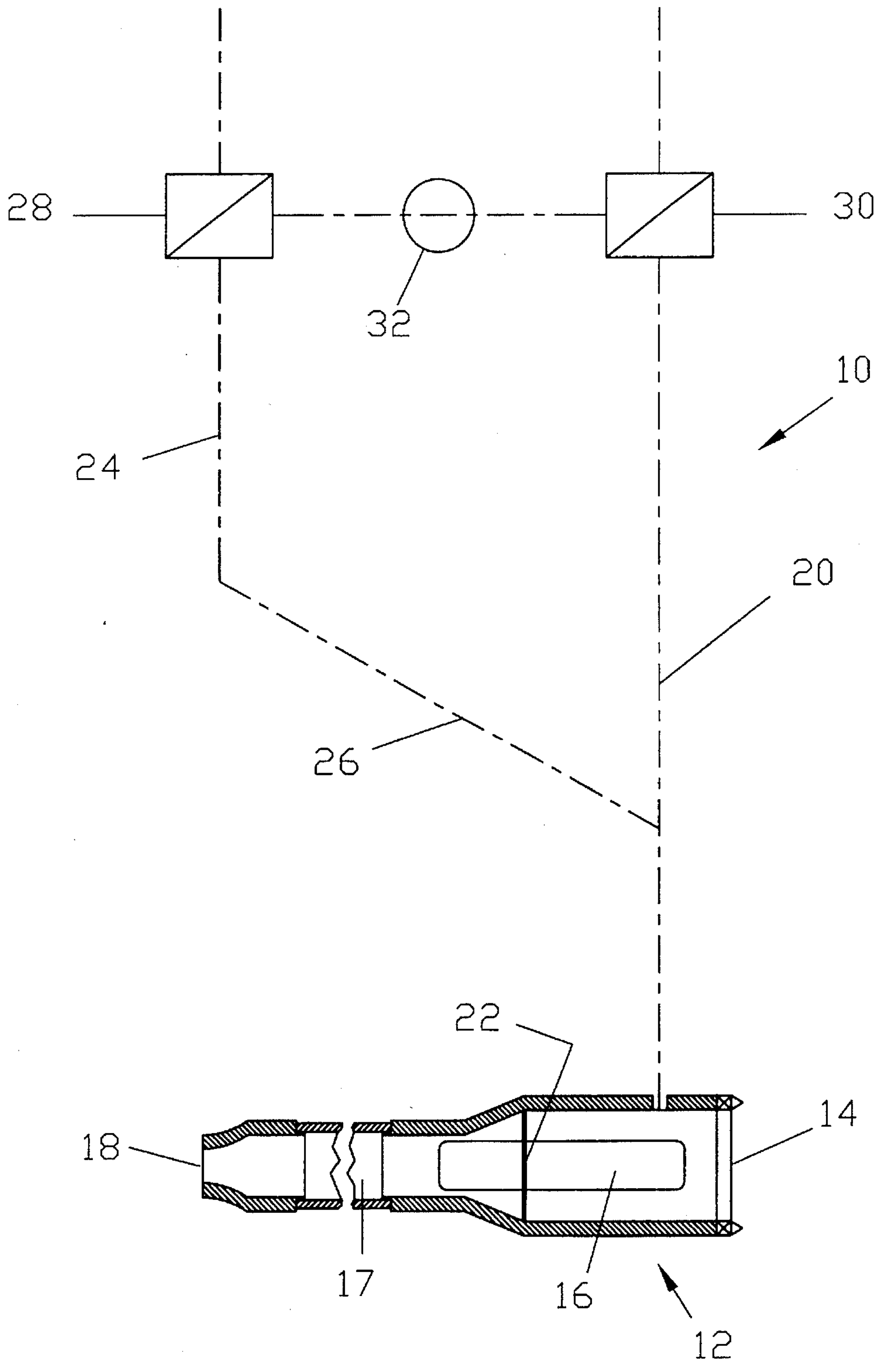
FIG. 1 is one embodiment of a system of the present invention for controlling injection of liquid into a resin sausage insertion chamber. This embodiment employs a pair of off/on valves and a timer to control the flow of liquid and gas.

FIG. 1 is a schematic representation of an elementary embodiment of the present invention for a system for injecting resin sausages into bolt holes by a rock bolter. The embodiment of FIG. 1 provides a resin sausage injection system 10 which has a resin sausage insertion chamber 12 having a sausage insertion valve 14 through which a resin sausage 16 can be passed. The resin sausage insertion chamber 12 attaches to a flexible tube 17 which in turn attaches to a resin sausage inserter 18 and is positioned over a rock bolt hole and serves to direct the resin sausage 16 into the bolt hole which has been drilled by the rock bolter.

A resin injection gas line 20 is provided which communicates with the resin sausage insertion chamber 12. Typically, air is supplied as the gas used to elect the resin sausage 16 from the resin sausage insertion chamber 12. The resin sausage 16 is provided with a parachute 22 which limits the flow of gas around the resin sausage 16 as it is being elected from the resin sausage insertion chamber 12 and travels along the flexible tube 17 and the resin sausage inserter 18. The parachute 22 also serves to hold the resin sausage 16 in a bolt hole after it has been placed and before a bolt is inserted.

A liquid injection line 24 is provided which communicates with the resin sausage insertion chamber 12. The communication can be direct or, alternatively, a branch line 26 such as shown in FIG. 1 can be provided which connects the liquid injection line 24 to the resin injection gas line 20.

A liquid off/on valve 28 is provided in the liquid injection line 24 to control the volume of liquid being supplied to the resin sausage insertion chamber 12 and to assure the liquid can be selectively supplied. Similarly, a gas off/on valve 30 is provided in the resin injection gas line 20 to assure the gas can be selectively supplied. A timer 32 is provided which can be set to control the sequencing of the opening and closing of the liquid off/on valve 28 and the gas off/on valve 30 and assure that the liquid is supplied before the gas. When the liquid is supplied to the resin sausage insertion chamber 12, it will be retained in the resin sausage insertion chamber 12 by the resin sausage 16 in combination with the parachute 22. The liquid provides a seal around the resin sausage 16 which will reduce the amount of gas bypassing the resin sausage 16.

For the embodiment illustrated in FIG. 1, the liquid off/on valve 28, the gas off/on valve 30, the timer 32, and the branch line 26, in combination, serve as means for injecting a controlled volume of liquid into the resin sausage insertion chamber 12.

Figure 2:
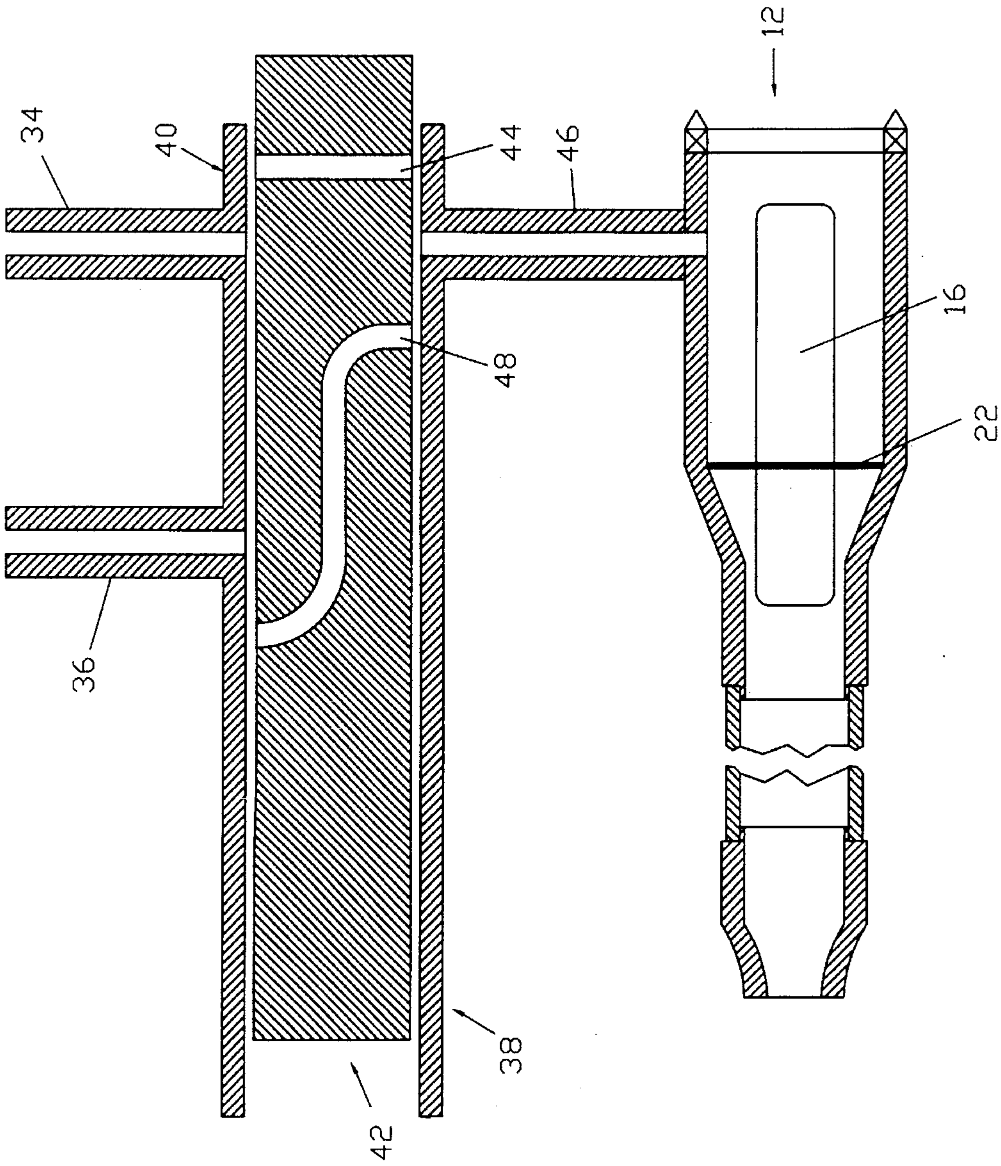
FIG. 2 illustrates a three way valve which can be substituted for the pair of off/on valves employed in the embodiment of FIG. 1.

FIG. 2 illustrates an alternative means for injecting a controlled volume of liquid into the resin sausage insertion chamber 12. As illustrated, air is employed as the gas to eject the resin sausage 16 from the resin sausage insertion chamber 12 and water is the liquid employed in combination with the air. In the embodiment of FIG. 2, an air line 34 and a water line 36 are connected to a three way valve 38. The three way valve 38 has a housing 40 which has a slide 42 therein. The slide 42 has a first passage 44 which is configured such that it is aligned with the air line 34 to communicate with a fluid line 46 which in turn communicates with the resin sausage insertion chamber 12. This defines a first position for the three way valve 38. A second passage 48 is provided which is configured such that it will allow communication between the water line 36 and the fluid line 46. This defines a second position for the three way valve. A third position is illustrated when neither air nor water is being communicated with the fluid line 46. An operator can manually control the injection of a controlled volume of water into the resin sausage insertion chamber 12 before air is provided to eject the resin sausage 16 from the resin sausage insertion chamber 12. If the three way valve 38 throttles the water flow so that the flow rate remains constant, a timer can be employed to assure that the appropriate amount of water is provided before the three way valve 38 is switched to supply air.

Figure 3:
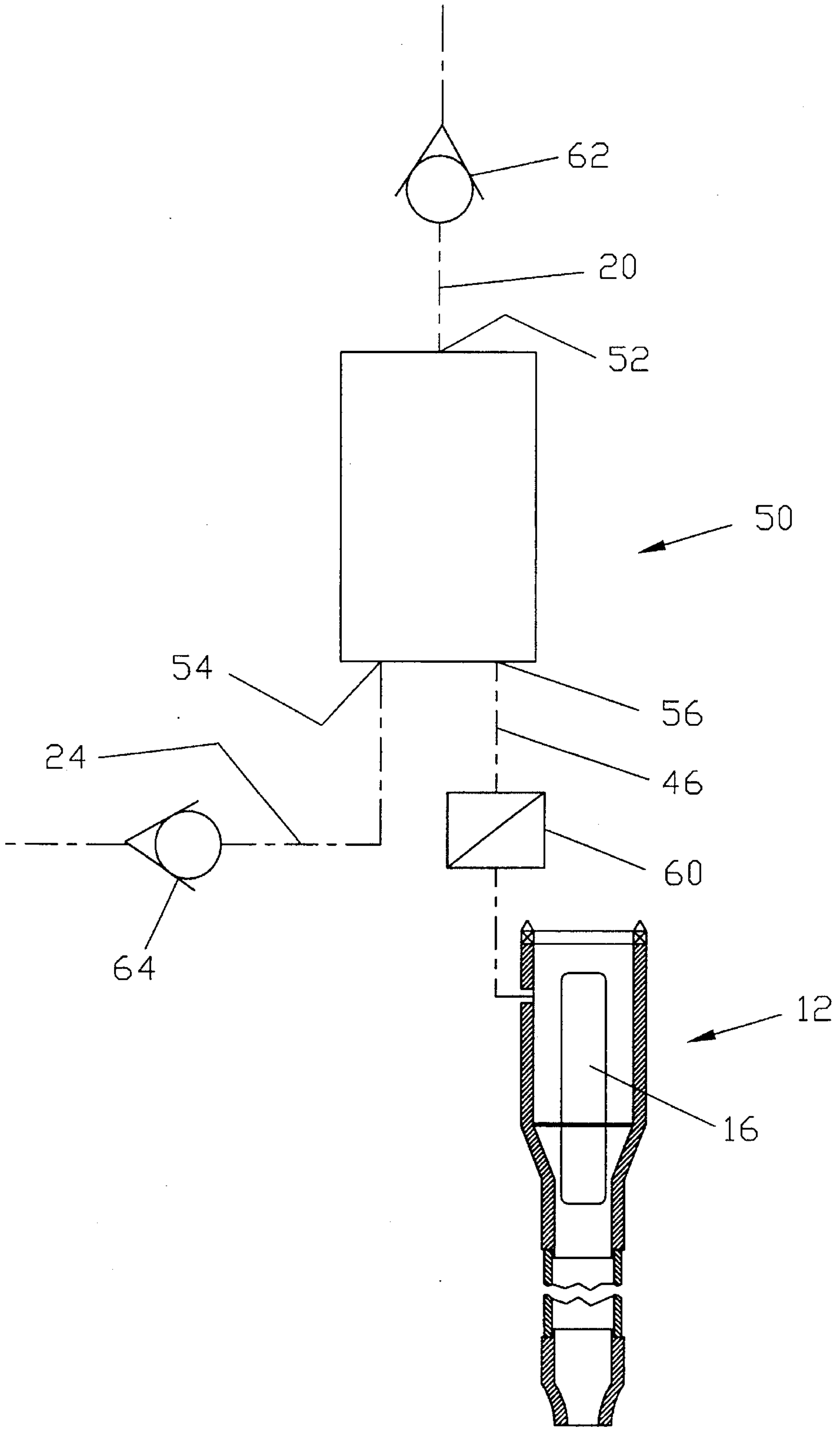
FIG. 3 illustrates a system for the present invention which provides an expansion chamber into which the liquid and gas are first introduced and from which the liquid and gas are sequentially introduced into the resin sausage insertion chamber.

While the embodiments of FIGS. 1 and 2 will provide a system which will introduce a controlled volume of liquid in advance of the motivating gas, the effectiveness of the system will dependent on the ability of the resin sausage 16 and parachute 22, in combination with the resin sausage insertion chamber 12 to maintain a liquid seal between the resin sausage insertion chamber 12 and the resin sausage 16. Maintaining a seal can be facilitated by providing an expansion chamber 50 such as illustrated in FIG. 3. The expansion chamber 50 has a gas port 52 which is connected to the resin injection gas line 20. A liquid port 54 attaches to the liquid injection line 24. A fluid port 56, positioned at an elevation which is lower than the gas port 52, is also provided to the expansion chamber 50. The fluid line 46 connects the fluid port 56 to the resin sausage insertion chamber 12 and is provided with a fluid off/on valve 60.

A resin injection gas line check valve 62 is provided in the resin injection gas line 20 and prevents reverse flow of gas in the resin injection gas line 20. The resin injection gas line check valve 62 prevents flow through the resin injection gas line 20 from the expansion chamber 50 when liquid is being supplied to the expansion chamber 50. Similarly, the liquid injection line 24 has a liquid injection line check valve 64 which prevents reverse flow in the liquid injection line 24 when gas is being supplied to the expansion chamber 50.

The valve configuration illustrated in FIG. 3 allows a controlled volume of liquid to be placed in the expansion chamber 50 when the fluid off/on valve 60 is closed and liquid is supplied through the liquid injection line 24. Since the gas in the expansion chamber 50 is confined, it will be compressed as the liquid is supplied to the expansion chamber 50. The liquid will continue to fill the expansion chamber 50 until the gas pressure in the expansion chamber 50 becomes equal to the pressure at which the liquid is being supplied. The liquid will cease to flow when the pressure in the expansion chamber 50 equals the pressure in the liquid injection line 24 and when the fluid off/on valve 60 is opened, the liquid in the expansion chamber 50 will flow into the resin sausage insertion chamber 12. The liquid will precede the gas since the fluid port is positioned beneath the liquid level. The liquid which is supplied first will serve as a seal around the resin sausage 16 so the gas cannot readily pass around the resin sausage 16.

Figure 4:
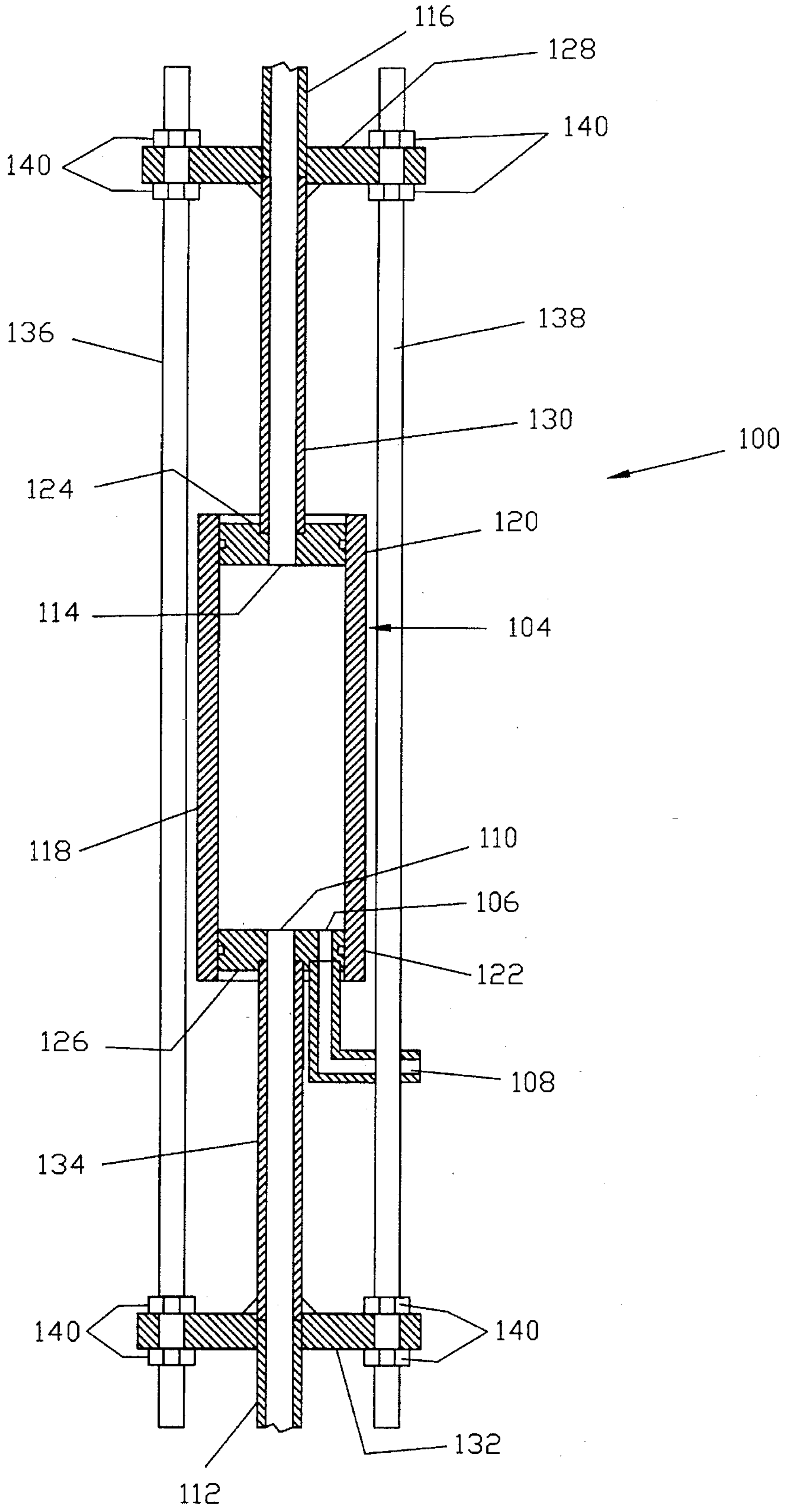
FIG. 4 illustrates an adjustable volume expansion chamber having a sleeve which has two slidably engaged ends. The volume of the chamber can be adjusted by the movement of the ends.

FIG. 4 illustrates the embodiment for an adjustable expansion chamber 100 which is preferably used in the system of the present invention. The adjustable expansion chamber 100 is has a volume which can be varied. The adjustable expansion chamber 100 has a shell 104. The shell 104 has a liquid port 106 which communicates with a liquid injection line 108. A fluid port 110 is provided in the shell 104 and communicates with a fluid line 112. A gas port 114 is provided in the shell 104. The gas port 114 is positioned at an elevation greater than the elevation of the fluid port 110 and communicates with a resin injection gas line 116.

The shell 104 has three components. A sleeve 118 is provided which has a first sleeve end 120 and a second sleeve end 122. A first end 124 is provided which terminates the first sleeve end 120 of the sleeve 118 and a second end 126 is also provided which terminates the second sleeve end 122. Both the first end 124 and the second end 126 slidably engage the sleeve 118 and their separation can be adjusted to vary the volume of the adjustable expansion chamber 100.

A first bracket 128 attaches to the first end 124 and has a gas port extension 130 passing therethrough which connects to the resin injection gas line 116. A second bracket 132 is attached to the second end 126 and has a fluid port extension 134 which passes through the second bracket 132 and connects to the fluid line 112.

A first threaded rod 136 serves as a first brace which slidably engages the first bracket 128 and the second bracket 132. A second threaded rod 138, spaced apart from the first threaded rod 136, serves as a second brace. The second threaded rod 138 slidably engages the first bracket 128 and the second bracket 132. Lock nuts 140 are employed which serve as means for locking the first threaded rod 136 and the second threaded rod 138 with respect to the first bracket 128 and the second bracket 132.

Figure 5:
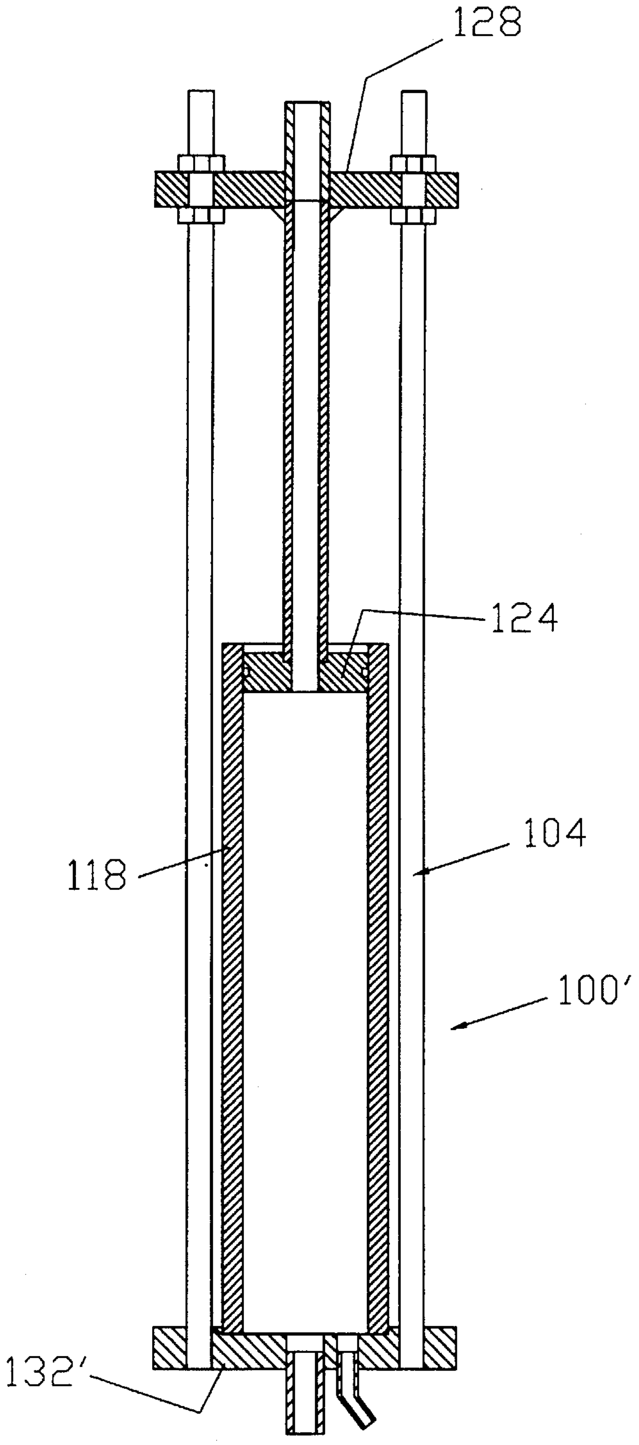
FIG. 5 illustrates another adjustable expansion chamber similar to the adjustable expansion chamber of FIG. 4; however, this expansion chamber has one end fixed with respect to the sleeve.

FIG. 5 illustrates an adjustable expansion chamber 100' similar to the adjustable expansion chamber 100 of FIG. 4.

In this embodiment, only the first end 124 slidably engages the sleeve 118. In this embodiment, rather than employing the second slidably engaged end 126 as shown in FIG. 4, a second bracket 132' is affixed to the sleeve.

Figure 6:
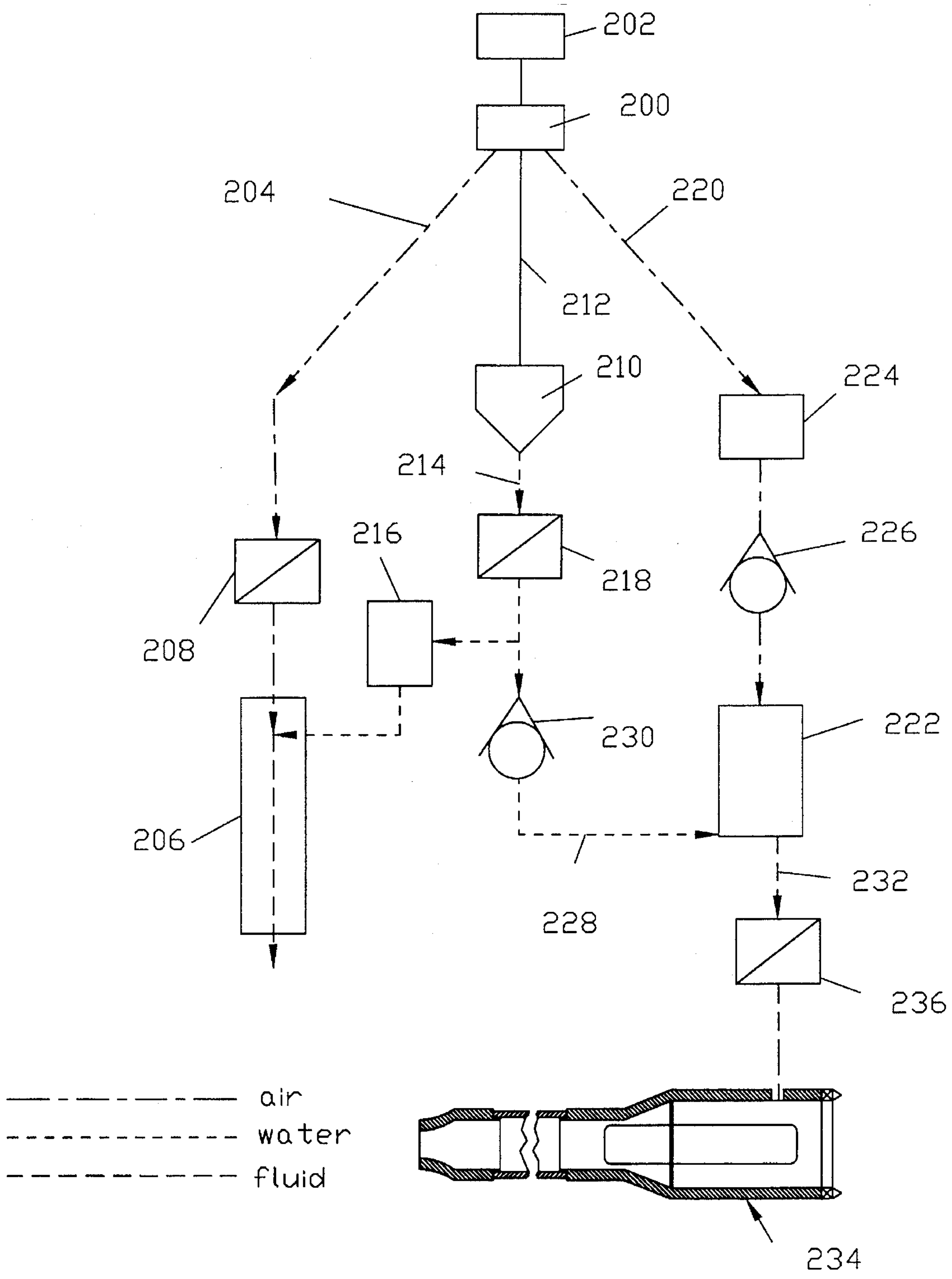
FIG. 6 illustrates an embodiment of the present invention for a system which not only controls the injection of resin sausages but also controls the air flushing system and dust suppressing system.

FIG. 6 is a schematic representation of another embodiment of the present invention for a system which is designed to be implemented with a rock bolter which has bolt hole flushing capacity. The system of FIG. 6 has an air tank 200 which is supplied with compressed air by an air compressor 202. The air tank 200 serves to store compressed air which is supplied to a flushing air line 204 which provides flushing air to a drill steel 206 of the rock drill. A flushing air off/on valve 208 is provided in the flushing air line 204 to allow the flushing air to be supplied on demand.

The system of FIG. 6 also provides a means for dust suppression during the flushing process. The dust suppression system includes a water tank 210 which is pressurized by the air tank 200 through a water pressurization line 212. The water tank 210 has a water line 214 which provides water to the flushing air being supplied to the drill steel 206. The water line 214 has a flow regulator 216, such as a needle valve, to limit the flow of water and allow it to be aspirated by the flushing air. A water off/on valve 218 is provided in the water line 214 and interposed between the water tank 210 and the flow regulator 216. The water off/on valve 218 allows the water to be supplied in a periodic manner to the drill steel 206. If the water off/on valve 218 is on and the flushing air off/on valve 208 is off, then the drill steel 206 will be supplied only with water which will irrigate the bolt hole to flush it. If the water off/on valve 218 is turned off or the flow regulator 216 is adjusted to zero flow and the flushing air off/on valve 208 is turned on, the bolt hole will be flushed with dry air and a substantial quantity of dust will be generated. If both the water off/on valve 218 and the flushing air off/on valve 208 are on and the flow regulator 216 is adjusted for flow, the water aspirated in the flushing air will tend to pelletize the particles and reduce the dust generated.

The air tank 200 also supplies air to a resin injection air line 220 which, in turn, supplies air to an expansion chamber 222 of the type discussed with regard to FIGS. 4 and 5. The resin injection air line 220 is connected to a pressure regulator 224 which assures that the pressure supplied to the resin injection air line 220 will be constant. An air check valve 226 is also provided in the resin injection air line 220 between the pressure regulator 224 and the expansion chamber 222. The air check valve 226 prevents back flow of air in the resin injection air line 220.

A water injection line 228 also connects to the expansion chamber 222. The water injection line 228 connects to the water line 214 subsequent to the water off/on valve 218. A water check valve 230 is provided in the water line 214 to avoid reverse flow of water in the water injection line 228.

A fluid line 232 is provided for supplying water and then air to a resin sausage insertion chamber 234. A fluid off/on valve 236 is provided in the fluid line 232 to regulate the flow of fluid into the resin sausage insertion chamber 234.

While the novel features of the present invention have been described in terms of particular embodiments and preferred applications, it should be appreciated by one skilled in the art that substitution of materials and details obviously can be made without departing from the spirit of the invention.

What we claim is:

1. A resin sausage injection system for a rock bolter comprising:

a resin injection gas line;

a liquid injection line;

a resin sausage insertion chamber; means for injecting a controlled volume of liquid into said resin sausage insertion chamber;

a flexible tube attached to said resin sausage insertion chamber; and a resin sausage inserter attached to said flexible tube.

2. The resin sausage injection system of claim 1 wherein said means for injecting a controlled volume of liquid into said resin sausage insertion chamber further comprises:

a branch line connecting between said liquid injection line and said resin injection gas line;

a gas off/on valve in said resin injection gas line;

a liquid off/on valve in said liquid injection line; and means for sequentially opening and closing said off/on valves in the following sequence, said liquid off/on valve, and said gas off/on valve.

3. The resin sausage injection system of claim 2 wherein said means for sequentially opening and closing said off/on valves is a timer.

4. The resin sausage injection system of claim 1 wherein said means for injection of a controlled volume of liquid into said resin sausage insertion chamber further comprises:

an expansion chamber having, a gas port which connects to said resin injection gas line, a liquid port which connects to said liquid injection line, and a fluid port positioned at an elevation lower than said gas port;

a fluid line connecting said fluid port to said resin sausage insertion chamber;

a fluid off/on valve interposed in said fluid line; and means for sequentially introducing liquid from said liquid injection line and gas from said resin injection gas line.

5. The resin sausage injection system of claim 4 wherein said means for sequentially introducing liquid from said liquid injection line and gas from said resin injection gas line further comprising:

a resin injection gas line check valve in said resin injection gas line to prevent flow from said expansion chamber through said resin injection gas line; and a liquid injection line check valve in said liquid injection line to prevent flow from said expansion chamber through said liquid injection line.

6. The resin sausage injection system of claim 5 wherein the rock bolter has an air flushing system having a flushing air line for providing flushing air to a drill steel of the rock drill, further comprising:

a resin injection air line; and a pressure regulator connected to said resin injection air line which connects to said resin injection gas line.

7. The resin sausage injection system of claim 6 wherein the rock bolter has a dust pelletizer including a water line for supplying water to the flushing air and the water connecting said liquid injection line such that said liquid injection line check valve lies between the water line and said expansion chamber.

8. The resin sausage injection system of claim 5 wherein said expansion chamber has an adjustable volume.

9. An expansion chamber for a rock bolter having a resin sausage injection system with a resin injection gas line, a liquid injection line, and a fluid line which communicates with a resin sausage insertion chamber, the expansion chamber comprising:

a shell;

a liquid port in said shell for communicating with the liquid injection line;

a fluid port in said shell for providing fluid to the fluid line;

a gas port in said shell for communicating with the resin injection gas line, said gas port being elevated with respect to said fluid port; and means for adjusting the volume of said shell.

10. The expansion chamber of claim 9 wherein said shell further comprises:

a sleeve having a first sleeve end and a second sleeve end;

a first end terminating the first sleeve end of said sleeve;

a second end terminating the second sleeve end of said sleeve;

wherein at least one of said first end and said second end slidably engages said sleeve; and a means for moving said first end relative to said second end.

11. The expansion chamber of claim 10 wherein said means for moving said first end relative to said second end further comprising:

a first bracket attached to said first end;

a second bracket attached to said second end; and at least one brace which engages said first bracket and said second bracket; and means for locking said first bracket and said second bracket to at least one of said at least one brace.

12. The expansion chamber of claim 11 wherein one of said first end and said second end is fixed with respect to said sleeve.

* * * * *